(12) United States Patent
Robbins

(10) Patent No.: US 10,455,805 B2
(45) Date of Patent: *Oct. 29, 2019

(54) DISPOSABLE AND BIODEGRADABLE LITTER SYSTEM FOR ANIMALS

(71) Applicant: Litter One, LLC, Waverly, OH (US)

(72) Inventor: Terry Robbins, Waverly, OH (US)

(73) Assignee: Litter One, LLC, Waverly, OH (US)

( * ) Notice: Subject to any disclaimer, the term of this patent is extended or adjusted under 35 U.S.C. 154(b) by 86 days.

This patent is subject to a terminal disclaimer.

(21) Appl. No.: 15/606,645

(22) Filed: May 26, 2017

(65) Prior Publication Data

US 2017/0258034 A1   Sep. 14, 2017

Related U.S. Application Data

(63) Continuation of application No. 15/166,334, filed on May 27, 2016, now Pat. No. 9,661,824, which is a continuation of application No. 13/457,659, filed on Apr. 27, 2012, now Pat. No. 9,374,977.

(60) Provisional application No. 61/499,573, filed on Jun. 21, 2011.

(51) Int. Cl.
*A01K 1/01* (2006.01)
*A01K 1/015* (2006.01)

(52) U.S. Cl.
CPC ............ *A01K 1/0114* (2013.01); *A01K 1/011* (2013.01); *A01K 1/0125* (2013.01); *A01K 1/0155* (2013.01)

(58) Field of Classification Search
CPC .... A01K 1/0114; A01K 1/011; A01K 1/0125; A01K 1/0155
See application file for complete search history.

(56) References Cited

U.S. PATENT DOCUMENTS

| | | |
|---|---|---|
| 3,154,052 A | 10/1964 | Sweeney |
| 3,233,588 A | 2/1966 | Thomas |
| 3,581,977 A | 6/1971 | Kirsky et al. |
| 3,820,679 A * | 6/1974 | Schweitzer ............ H02B 15/04 220/507 |
| 4,094,454 A | 6/1978 | Snyder |
| D253,273 S | 10/1979 | Matzdorff |
| 4,487,163 A | 12/1984 | Jobert et al. |
| 4,649,862 A | 3/1987 | Neary |
| 4,779,567 A | 10/1988 | Smith |
| 4,800,841 A | 1/1989 | Yananton et al. |
| 4,807,563 A | 2/1989 | Berry et al. |
| 4,967,692 A | 11/1990 | Mills |
| 4,976,218 A | 12/1990 | Cirami |
| 5,007,530 A | 4/1991 | Weismantel |
| 5,035,205 A | 7/1991 | Schiller et al. |
| 5,080,044 A | 1/1992 | Bosworth |
| 5,080,046 A | 1/1992 | Cassone |
| 5,129,364 A | 7/1992 | Pirkle |

(Continued)

*Primary Examiner* — Joshua D Huson
(74) *Attorney, Agent, or Firm* — Standley Law Group LLP

(57) ABSTRACT

A biodegradable litter kit to be used for the collection and disposal of animal waste. The kit includes a litter box having a tray portion and a retractable lid. The tray has a bottom and at least one protruding side. The box includes a perforated false bottom positioned within the tray for holding a layer of fresh litter above the bottom of the tray. The perforated false bottom permits for the passage of soiled litter but prevents the passage of fresh litter to the bottom of the tray thus keeping a layer of fresh litter accessible for use by an animal.

9 Claims, 18 Drawing Sheets

(56) References Cited

U.S. PATENT DOCUMENTS

| | | | |
|---|---|---|---|
| D333,931 S | 3/1993 | Wein | |
| 5,211,134 A | 5/1993 | Bolo, III | |
| D340,323 S | 10/1993 | Wagner | |
| 5,303,675 A | 4/1994 | Van Den Bergh | |
| 5,329,878 A * | 7/1994 | McCauley | A01K 1/0107 119/165 |
| 5,361,725 A * | 11/1994 | Baillie | A01K 1/0107 119/161 |
| D372,565 S | 8/1996 | Rice | |
| 5,564,366 A | 10/1996 | Hancock | |
| D378,451 S | 3/1997 | Schmidt | |
| 5,676,090 A * | 10/1997 | Cannady, Jr. | A01K 1/0107 119/165 |
| 5,713,302 A * | 2/1998 | Walter | A01K 1/0107 119/165 |
| 5,806,461 A * | 9/1998 | Kiera | A01K 1/0107 119/165 |
| 5,816,195 A | 10/1998 | Flynn | |
| 5,924,383 A * | 7/1999 | Smith | A01K 1/0157 119/165 |
| D417,549 S | 12/1999 | Cassani et al. | |
| 6,050,223 A * | 4/2000 | Harris | A01K 1/0107 119/165 |
| D435,149 S | 12/2000 | Kleinberg | |
| 6,205,953 B1 * | 3/2001 | Ginn | A01K 1/0107 119/165 |
| 6,371,048 B1 * | 4/2002 | Smith | A01K 1/0114 119/166 |
| 6,382,131 B1 | 5/2002 | McGivern | |
| D492,194 S | 6/2004 | Kim | |
| 6,743,421 B2 * | 6/2004 | Vasconcellos | B01D 53/1493 424/76.1 |
| D498,025 S | 11/2004 | Tessier et al. | |
| 7,096,823 B1 | 8/2006 | Smeltzer | |
| 7,380,519 B2 | 6/2008 | Ikegami et al. | |
| 7,458,336 B2 * | 12/2008 | Eu | A01K 1/033 119/163 |
| 7,621,233 B2 | 11/2009 | Dukes et al. | |
| D607,281 S | 1/2010 | Meyers | |
| D613,164 S | 4/2010 | Lee | |
| D613,914 S | 4/2010 | Askinasi | |
| D652,587 S | 1/2012 | Matsuo et al. | |
| 8,230,810 B2 * | 7/2012 | Mynatt | A01K 1/0114 119/166 |
| D685,148 S * | 6/2013 | Khalili | D30/161 |
| D690,059 S | 9/2013 | Robbins | |
| D692,192 S | 10/2013 | Graves et al. | |
| 8,656,863 B2 | 2/2014 | Havluciyan | |
| 8,733,286 B2 * | 5/2014 | Sweetman | A01K 1/0114 119/161 |
| D711,601 S | 8/2014 | Robbins | |
| 9,204,617 B2 | 12/2015 | Yamamato et al. | |
| D754,406 S | 4/2016 | Karsted | |
| D759,323 S | 6/2016 | Finkeldei | |
| 9,374,977 B2 | 6/2016 | Robbins | |
| 9,661,824 B2 | 5/2017 | Robbins | |
| D804,111 S * | 11/2017 | Robbins | D30/161 |
| D816,281 S * | 4/2018 | Stravitz | D30/161 |
| D821,664 S * | 6/2018 | Stiner | D30/161 |
| 2003/0143182 A1 * | 7/2003 | Vasconcellos | B01D 53/1493 424/76.1 |
| 2004/0244707 A1 | 12/2004 | Sannikka | |
| 2004/0261727 A1 | 12/2004 | Matsuo et al. | |
| 2008/0035069 A1 | 2/2008 | Yamamato et al. | |
| 2009/0250014 A1 * | 10/2009 | Juan | A01K 1/0107 119/482 |
| 2009/0260578 A1 | 10/2009 | Yamamato et al. | |
| 2013/0112149 A1 * | 5/2013 | Robbins | A01K 1/0114 119/166 |
| 2015/0245588 A1 * | 9/2015 | Perorazio | A01K 1/0107 119/166 |
| 2016/0270362 A1 * | 9/2016 | Robbins | A01K 1/0114 |
| 2017/0258034 A1 * | 9/2017 | Robbins | A01K 1/0114 |

* cited by examiner

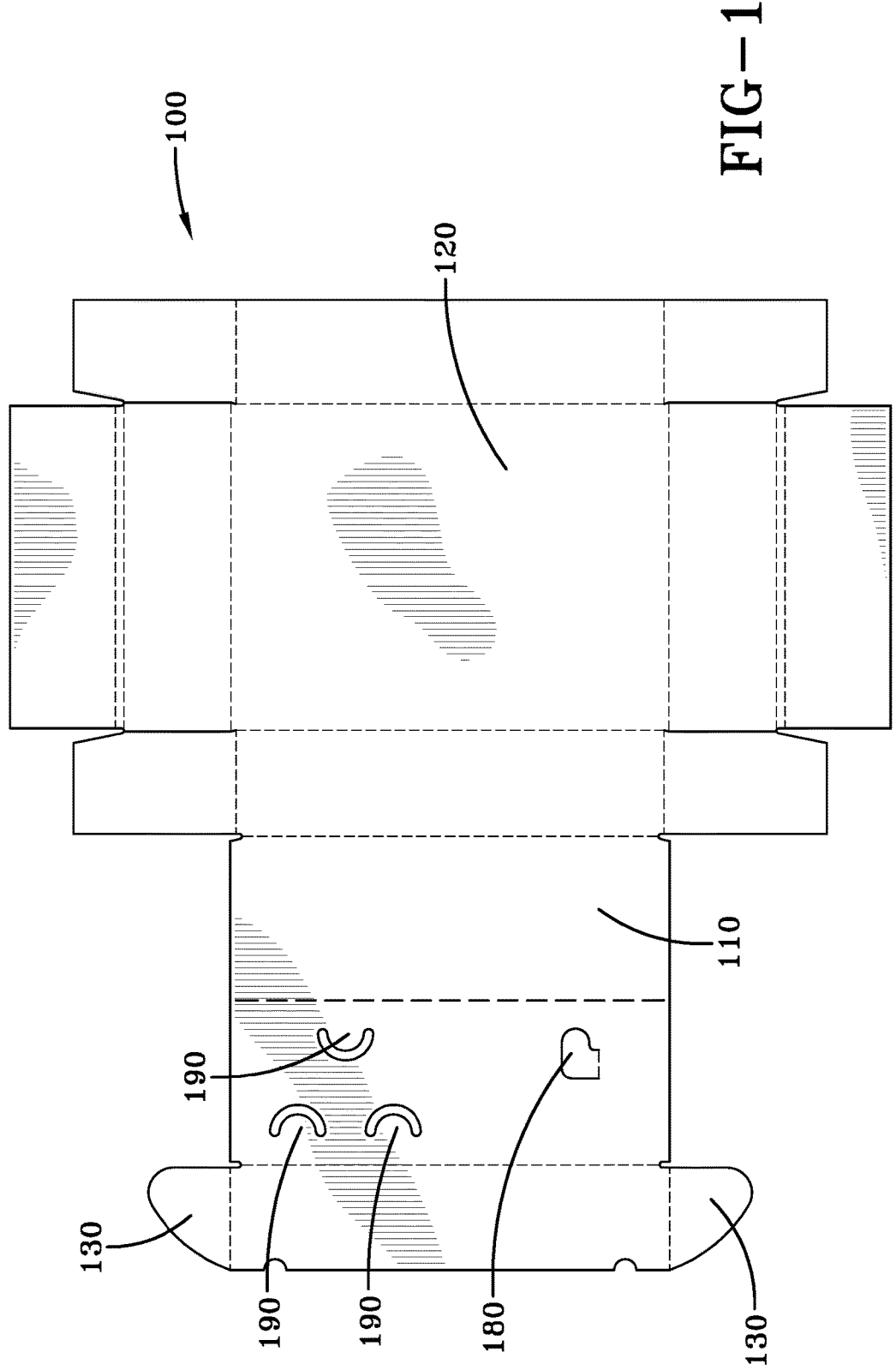

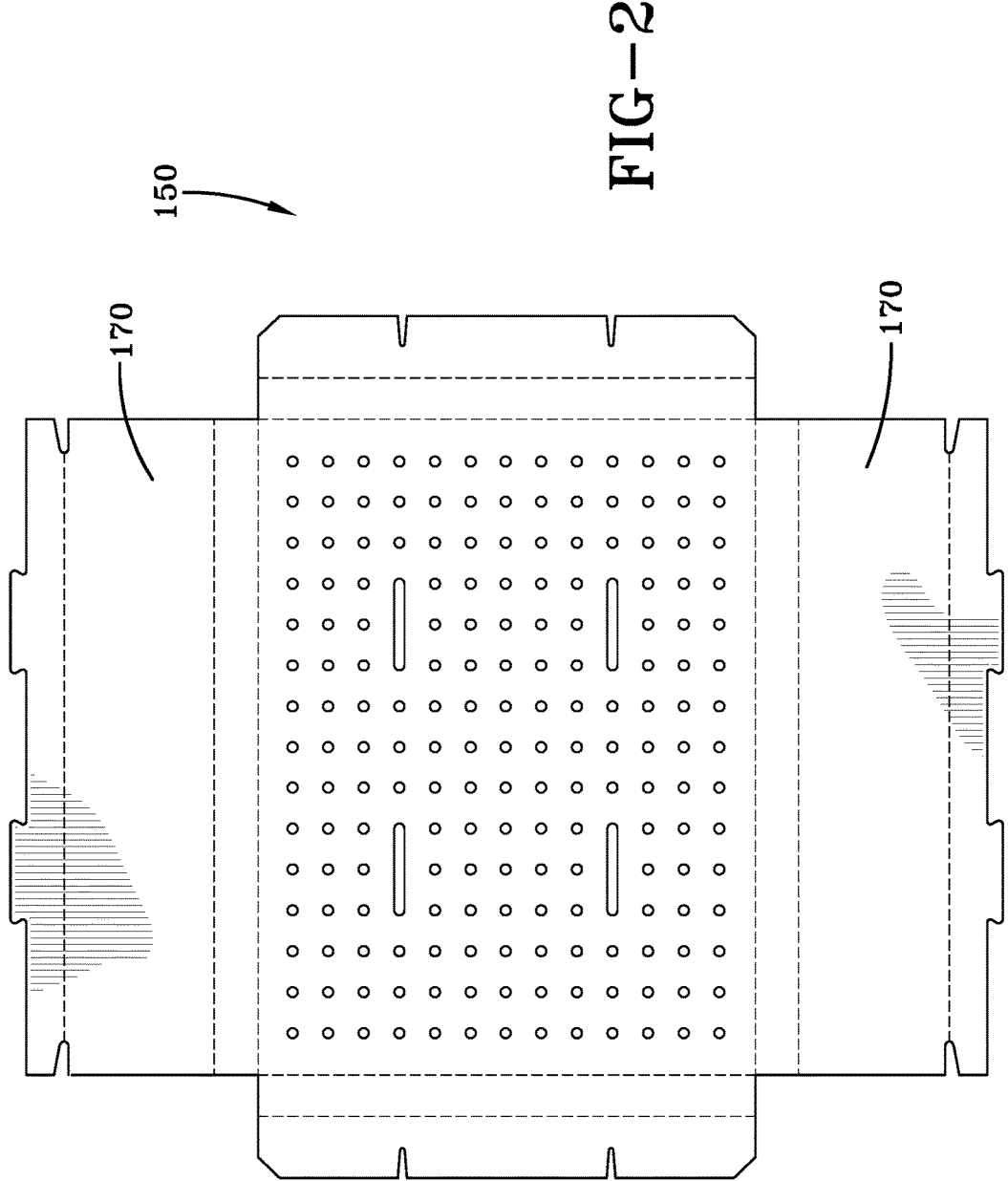

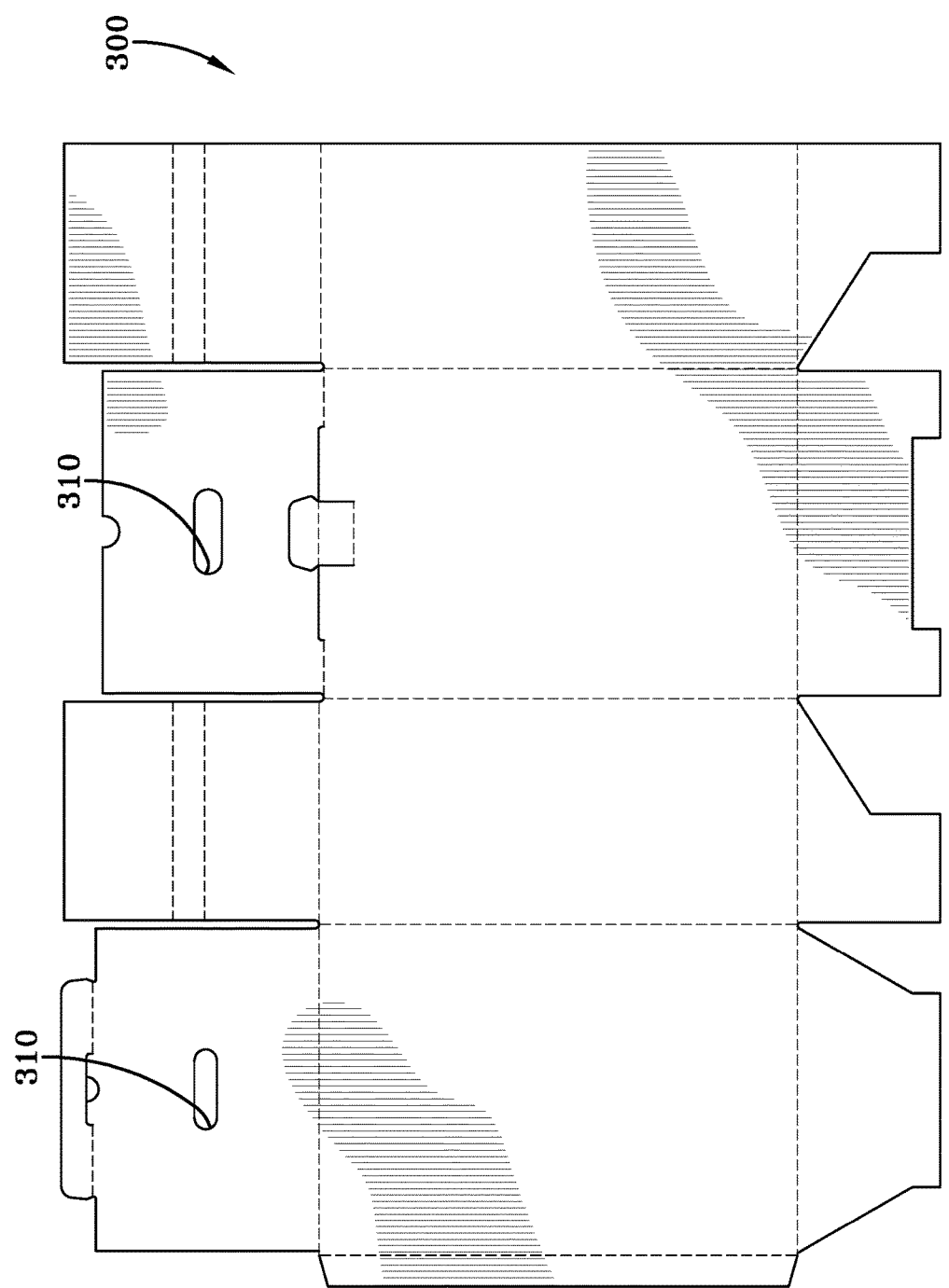

DISPOSABLE AND BIODEGRADABLE LITTER SYSTEM FOR ANIMALS

FIELD OF THE INVENTION

This application is a continuation of U.S. patent application Ser. No. 15/166,334, filed May 27, 2016 and issuing as U.S. Pat. No. 9,661,824 on May 30, 2017, which is a continuation of U.S. patent application Ser. No. 13/457,659, filed on Apr. 27, 2012 and which issued as U.S. Pat. No. 9,374,977 on Jun. 28, 2016, which claims priority to U.S. Provisional Application No. 61/499,573, filed on Jun. 21, 2011. All of which are hereby incorporated by reference in their entirety.

FIELD OF THE INVENTION

The present invention relates to environmentally friendly solutions for disposing of animal waste. Specifically, exemplary embodiments relate to a biodegradable litter box and biodegradable litter box accessories.

BACKGROUND AND SUMMARY OF THE INVENTION

Properly maintaining a clean and sanitary litter box is an important aspect of cat ownership. Traditionally, cat owners have implemented non-disposable boxes containing disposable litter to tend to their cat's waste. In these traditional litter systems, the box is filled with clean litter which either remains in the box until all of the litter (including the animal waste which has accumulated) is removed and replaced with a fresh batch of litter or in the case of scoopable litter, is scooped from the box a little at a time along with the animal waste and replaced on an as need basis. Though different varieties of cat litter exist in the market, the majority of cat litter used today is disposable but non-biodegradable. The soiled litter is typically disposed of in a trash bag or a similar container designed to prevent the dissipation of the soiled litter and any attendant smells. This non-biodegradability of the litter waste coupled with the fact that most cat litter comes from a non-renewable source means that cat litter is not environmentally friendly. Further, traditional non-biodegradable litters contain ingredients that may be dangerous to animals and humans that maintain traditional litter boxes in their homes.

Advances that have been made to the traditional litter system have primarily focused on making the process of cleaning the litter box easier, altering the shape of the litter box to better contain the cat litter, reducing the smell associated with the litter box through improved litters, ventilation, etc. For example, automated litter boxes now exist that utilize motorized components to scoop soiled litter from the box and move it to a covered container leaving clean litter in the box. Similarly, some cat boxes come with air filters designed to improve the air quality within and surrounding the box. Disposable box liners have also been implemented to reduce the amount of time required to clean the box—the liners are placed inside the box and filled with litter, when the litter is soiled, the liner and the soiled litter can be lifted from the box and disposed of and then replaced by a fresh liner and litter. While all are welcomed advancements, there remains a need in the art for an environmentally sound and completely biodegradable litter system for use by cats and other animals. Current litter box systems today simply do not provide a 100% biodegradable solution for the disposal of cat litter.

A preferred exemplary embodiment comprises a litter box that is completely biodegradable. Some exemplary embodiments comprise a litter box comprising a tray portion for holding litter wherein the tray is defined by a bottom and at least one side extending away from the bottom and further comprising a retractable lid connected to at least part of the side of the tray such that the lid may be selectively moved from a position in which it prevents access to the tray portion of the box into a position in which an animal may access the tray of the box to deposit waste in the litter. There may be a locking mechanism for holding the lid in a retracted position. For example, the tray may define at least one opening for selectively receiving a flap defined by the lid. Friction may hold the flap within the opening until it is desired that the lid be transitioned into another position. The box may comprise a false bottom positioned within the tray wherein the false bottom is adapted to hold a layer of fresh litter at a position located between the bottom of the tray and the retractable lid. The false bottom is preferably perforated meaning it defines at least one perforation (i.e. opening) wherein the perforation is preferably too small to permit passage of the fresh litter to the bottom of the tray, but large enough to permit passage of soiled litter once it has been broken down by being placed in contact with liquid animal waste. There may be a support member running between the bottom of the tray and the false bottom which supplies extra strength to the false bottom. In some exemplary embodiments a separator piece selectively positioned over the layer of fresh litter for holding the litter within the box when the box is not being used may be included. The litter box, the perforated false bottom, and the separator may all be biodegradable. Preferred exemplary embodiments include biodegradable accessories such as a scooper and at least one biodegradable waste bag. In a preferred embodiment, once an animal has utilized a biodegradable litter box to deposit waste the entire kit may be disposed of as a single, biodegradable unit.

BRIEF DESCRIPTION OF THE DRAWINGS

A better understanding of the disclosed embodiments will be obtained from a reading of the following detailed description and the accompanying drawings wherein identical reference characters refer to identical parts and in which:

FIG. 1 shows a design schematic of an exemplary embodiment of a litter box comprising a retractable lid;

FIG. 2 shows a design schematic of an exemplary embodiment of a perforated false bottom that may be positioned within a litter box;

FIG. 5 shows a design schematic of a master box defining a handle where the box may be used to ship a biodegradable litter kit;

DETAILED DESCRIPTION

Figure 6A:
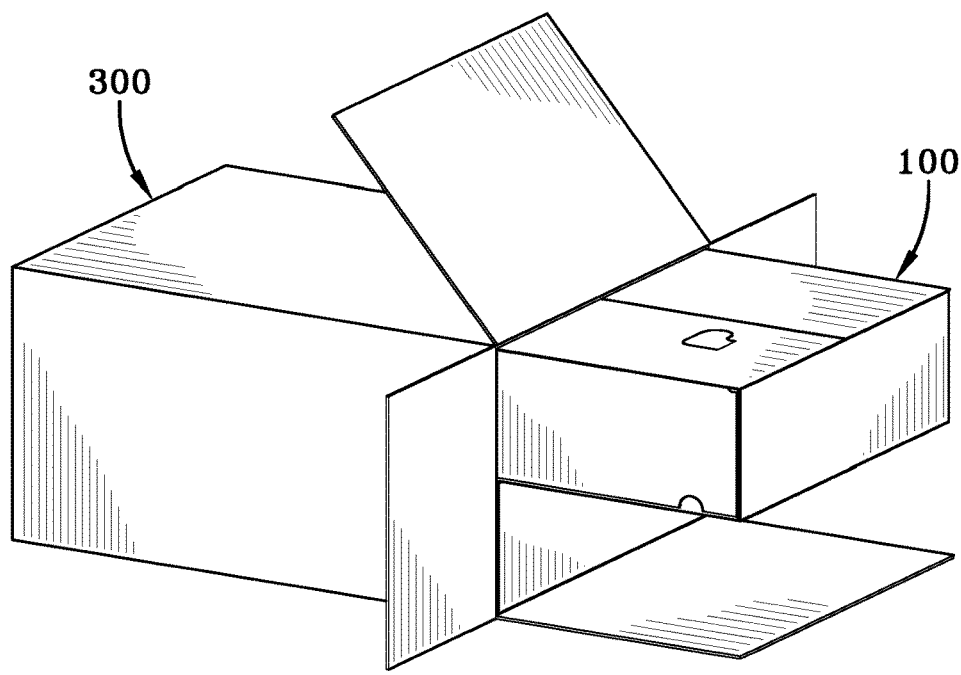
FIG. 6a shows a right side perspective view of an exemplary master box being used to hold two biodegradable litter boxes; 6b shows a top perspective view of an exemplary litter box comprising a retractable lid and a tray for holding cat litter where the lid is shown in a closed position; 6c shows a front perspective view of the exemplary litter box of FIG. 6b shown with the retractable lid in a retracted position and shown with a separator piece covering litter housed by the tray of the box; 6d shows a detailed right side perspective view of the lid of the exemplary litter box of FIG. 6b showing a latch for holding a scooper in a holding position; 6e shows a right side perspective view of the retractable lid of the exemplary box of FIG. 6b being placed in a retracted position and locked in the position by exemplary flaps defined by the box; 6f shows a back perspective view of the exemplary box of FIG. 6b shown holding an exemplary scooper and exemplary biodegradable disposable bags.
Figure 6B:
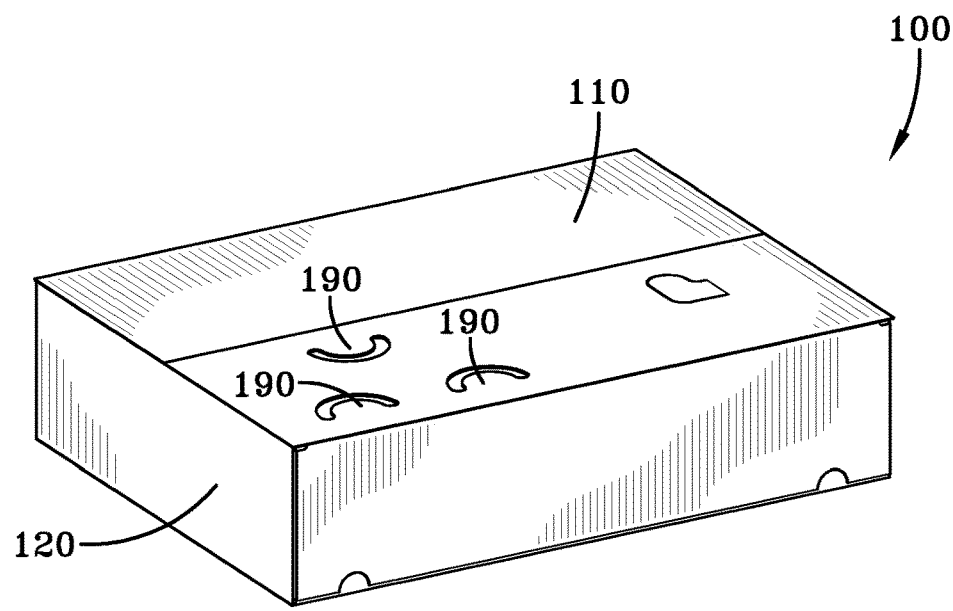
Figure 13:
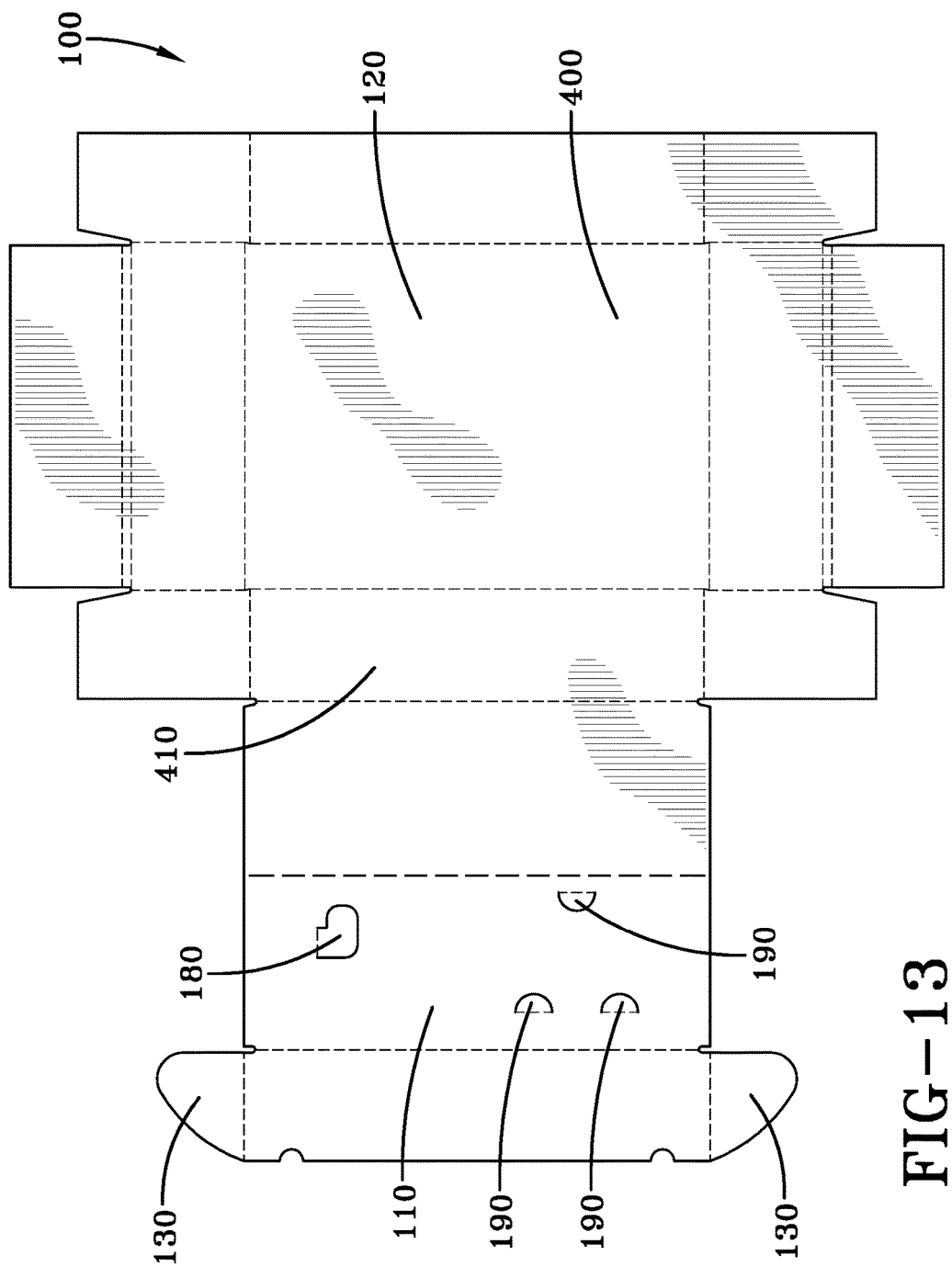
FIG. 13 shows a design schematic for a biodegradable litter box having a tray portion for holding litter, wherein the tray has a bottom and at least one side extending away from the bottom and a retractable lid connected the one side.

One exemplary embodiment comprises a biodegradable litter kit. In a preferred exemplary embodiment, the litter kit is 100% biodegradable. A biodegradable litter kit may include a litter box having a tray for holding cat litter and a retractable lid selectively positioned over the tray in a closed position. A closed position of a retractable litter box lid is a position in which it prevents access to the portion of the litter box tray configured to hold cat litter. FIG. 1 shows a design schematic for an exemplary embodiment of a biodegradable litter box 100 having a retractable lid 110 and a tray 120 for holding cat litter. The litter box having a retractable lid may be configured such that the lid is integral with the tray. In other words, the tray of the box which is configured to hold cat litter, as well as the lid which may be retractably positioned over the tray in a closed position, are formed from a single piece of biodegradable material. FIG. 1 shows an exemplary embodiment of a litter box 100 comprising a tray 120 for holding cat litter and a retractable lid 110 where the lid is integral with the tray portion of the box. As shown in FIG. 13 an exemplary biodegradable litter box may comprise a tray 120 portion for holding litter wherein the tray has a bottom 400 and at least one side 410 extending away from the bottom and further comprising a retractable lid connected to at least part of the side 410 of the tray such that the lid 110 may be selectively moved from a position in which it prevents access to the tray 120 portion of the box into a position in which an animal may access the tray of the box to deposit waste in the litter In a preferred exemplary embodiment, a litter kit comprises a litter box having a tray holding cat litter and a retractable lid positioned over the tray such that the lid prevents access to the litter until it is desired that the litter be used. When such an exemplary embodiment is used, the retractable lid may be retracted from its position over the tray leaving the litter contained in the tray exposed for use by an animal. Exemplary embodiments of a litter kit comprising a litter box with a retractable lid may comprise a locking mechanism 130 adapted to selectively hold the lid in a retracted position on the tray. A retracted position is a position which may permit use of litter within the tray by an animal. In some embodiments, a locking mechanism 130 may be at least one flap defined by the litter box that may be used to selectively hold the lid in a retracted position. FIG. 1 shows an exemplary embodiment of a litter box which defines two flaps 130 for selectively holding the lid in a retracted position on the tray. As can be clearly seen in FIG. 6e, in some exemplary embodiments where a litter box defines at least one flap 130 for selectively locking the lid 110 of the box in a retracted position, the box may also define at least one opening for receiving the flap 130 such that once the flap is placed within the opening, the lid 110 is held in a retracted position. In a preferred exemplary embodiment, the tray portion of the box defines at least one opening for receiving a flap defined by the lid of the box. When the flap is selectively received by the opening, friction may hold the lid in a desired position (i.e. retracted, closed, etc.) until it is desired that the lid be selectively transitioned into a different position at which time the flap may be removed from the opening.

Exemplary embodiments of a biodegradable litter kit comprising a litter box having a tray holding cat litter and a retractable lid positioned over the tray such that the lid prevents access to the litter until it is desired that the litter be used may further comprise a separator piece positioned over the cat litter to hold the cat litter in place within the tray.

Figure 3:
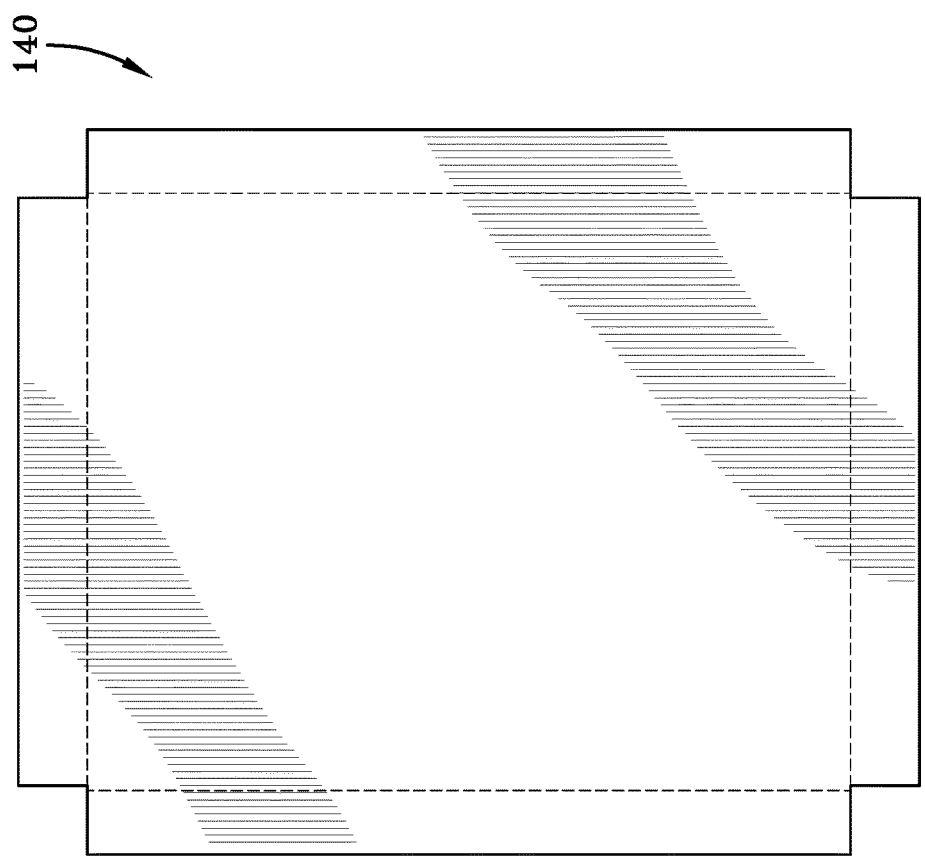
FIG. 3 shows a design schematic of an exemplary embodiment of a separator piece that may be utilized to seal litter in a litter box.
Figure 6C:
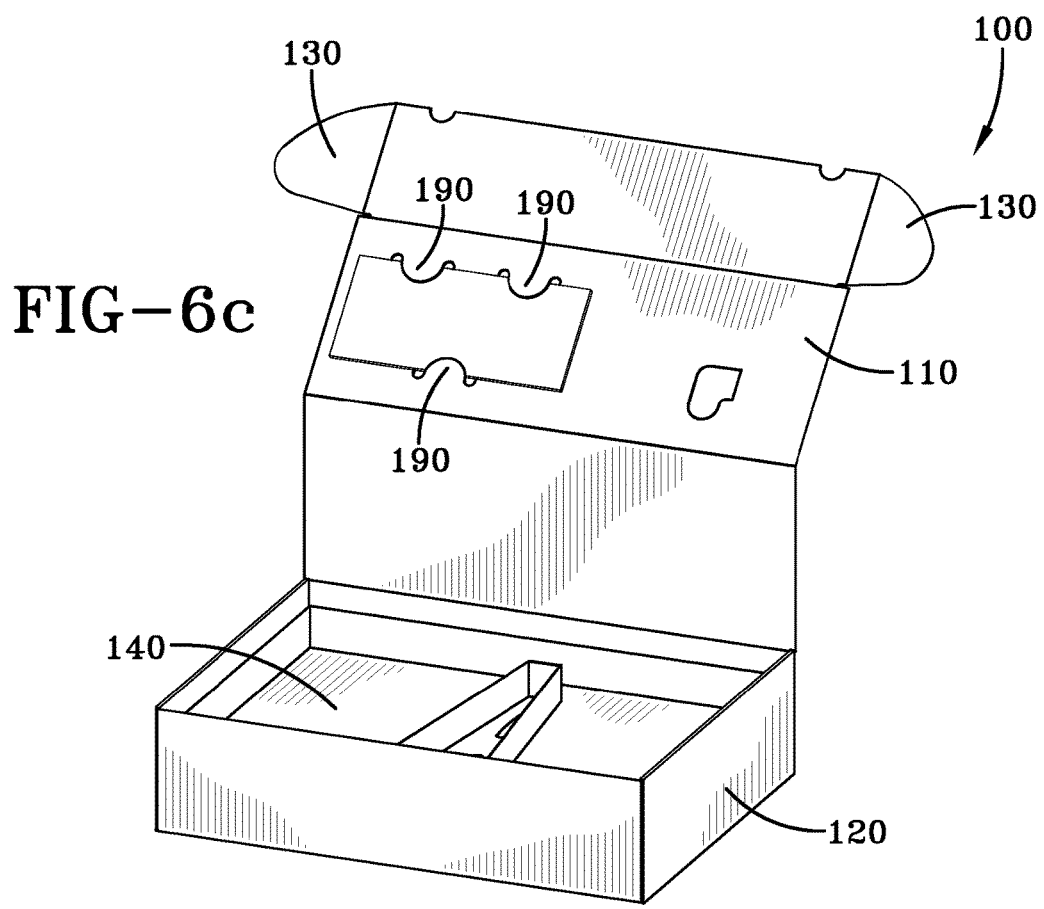

A separator piece positioned over the cat litter may hold the litter within the tray of a litter box such that the kit may be shipped without the litter being displaced from a position inside the tray of the litter box. FIG. 3 shows an exemplary embodiment of a separator piece 140 which may be part of a biodegradable litter kit. In a preferred exemplary embodiment, the separator piece is made from the same type of biodegradable material as the litter box and is shaped such that it snugly fits within the tray portion of the box such that litter cannot escape between the edge of the separator piece and the litter box. FIG. 6c shows a litter box kit comprising a litter box and a separator piece 140 positioned within the tray of the box such that litter is held in place within the tray by the separator piece. In exemplary embodiments of a litter kit comprising a litter box having a tray holding cat litter, a retractable lid positioned over the tray such that the lid prevents access to the litter until it is desired that the litter be used, and a separator piece, it may be necessary to retract the lid of the litter box and remove the separator piece from over the litter before the litter may be accessed by an animal. In some exemplary embodiments where a biodegradable litter kit comprises a litter box 100 having a tray 120 holding litter and a lid 110, and a separator piece 140, the kit may further comprise at least one litter box accessory which is placed within the tray of the litter box after the separator piece has been placed over the litter. In such an exemplary embodiment, the separator piece may help keep the litter within the tray of the litter box and may also keep the at least one litter box accessory from coming into contact with the litter.

In some exemplary embodiments, a biodegradable litter kit comprises a litter box having a tray holding cat litter and a retractable lid positioned over the tray such that the lid prevents access to the litter until it is desired that the litter be used where the retractable lid also seals the litter inside the tray so that the kit may be shipped or otherwise moved without risk of displacing the litter from the tray. In other words, in some exemplary embodiments it is not necessary to have a separator piece to keep litter in a desired location within the tray portion of a litter box even when the box is transported. In such an exemplary embodiment, any litter box accessories which may be placed within the tray of the litter box prior to use (for example, when the kit is being transported to a user's home) may be placed in a container (preferably biodegradable) which keeps them separated from the litter. An example of a container that might be used to hold litter box accessories within the tray of a litter box during transport is a box made from biodegradable materials.

Figure 7A:
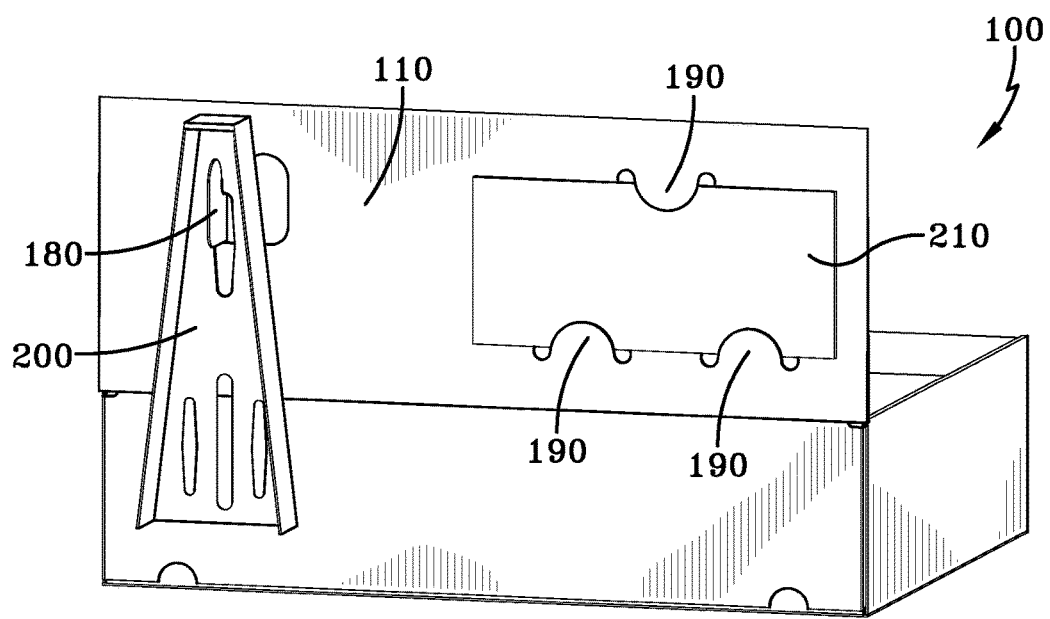
FIG. 7a shows a back plan view of the exemplary litter box of FIG. 6b shown holding an exemplary scooper with an exemplary hook and exemplary disposable bags with an exemplary disposable bag holding means; 7b shows a front perspective view of the exemplary box of FIG. 6b shown having a separator piece that has been partially removed from a position in which it covers litter housed in the tray of the box; 7c shows a front perspective view of the exemplary box of FIG. 7b shown with the lid retracted and shown housing litter in the tray of the box; 7d shows two front perspective views of the exemplary litter box of FIG. 6b, one view showing litter housed in the tray pushed to one side of the box exposing an exemplary false bottom and the other view showing an exemplary scooper being used to place used litter in a disposable bag; 7e shows a front perspective view of the exemplary box of 6b shown with a separator piece being reinserted over the litter house by the tray in preparation of disposing of the litter box and the used contents; 7f shows a front perspective view of the exemplary litter box of FIG. 6b shown with the retractable lid in a closed position ready for disposal.
Figure 7B:
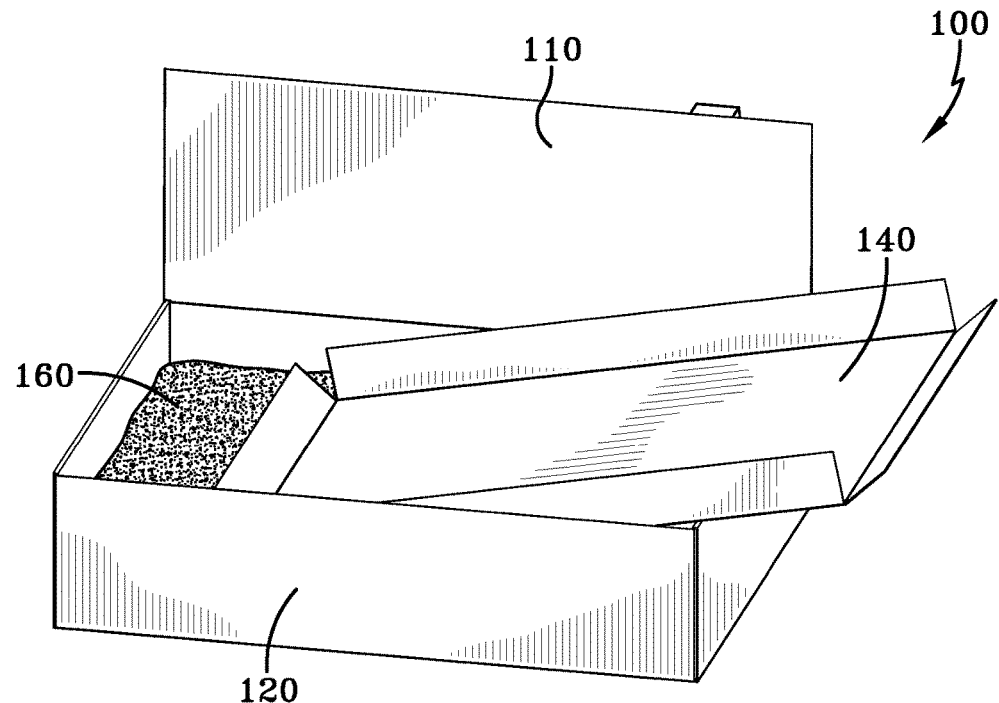
Figure 7C:
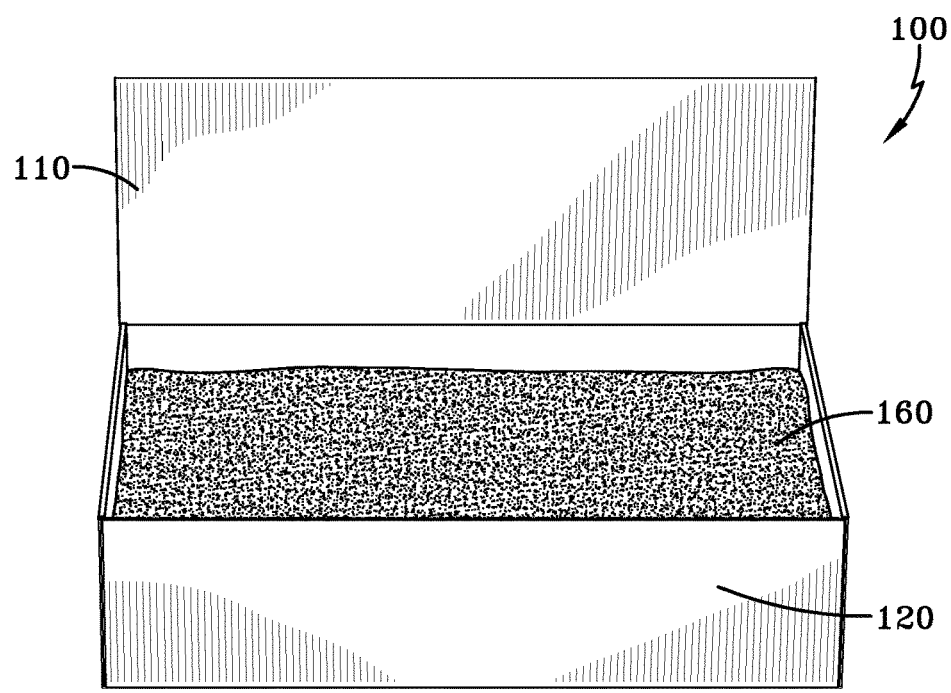
Figure 7D:
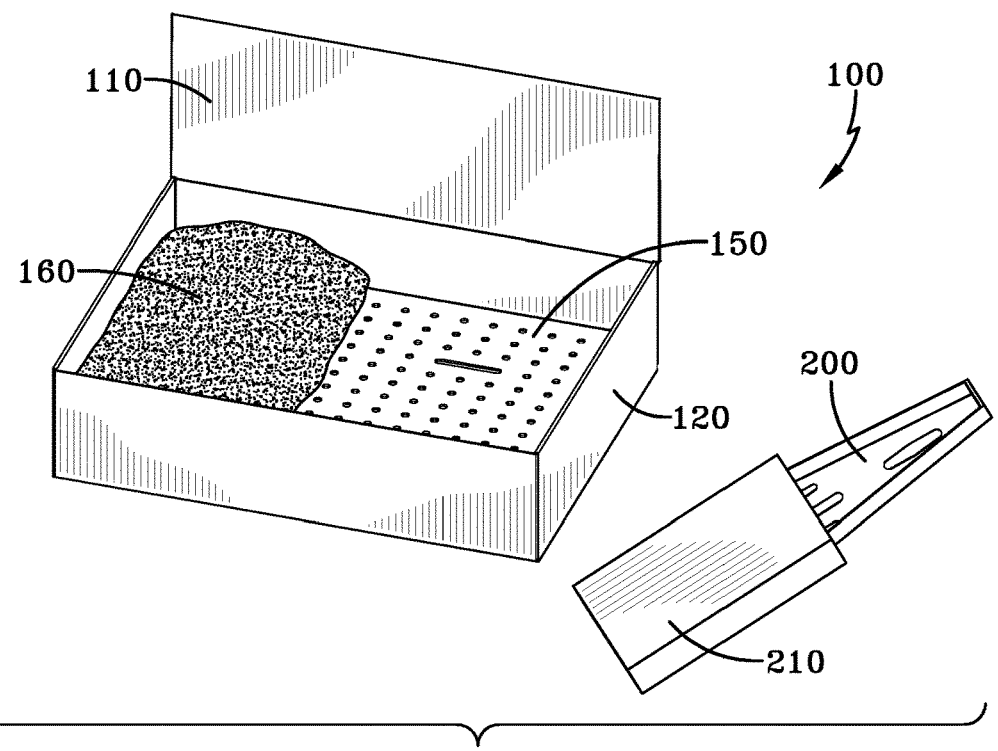
Figure 7E:
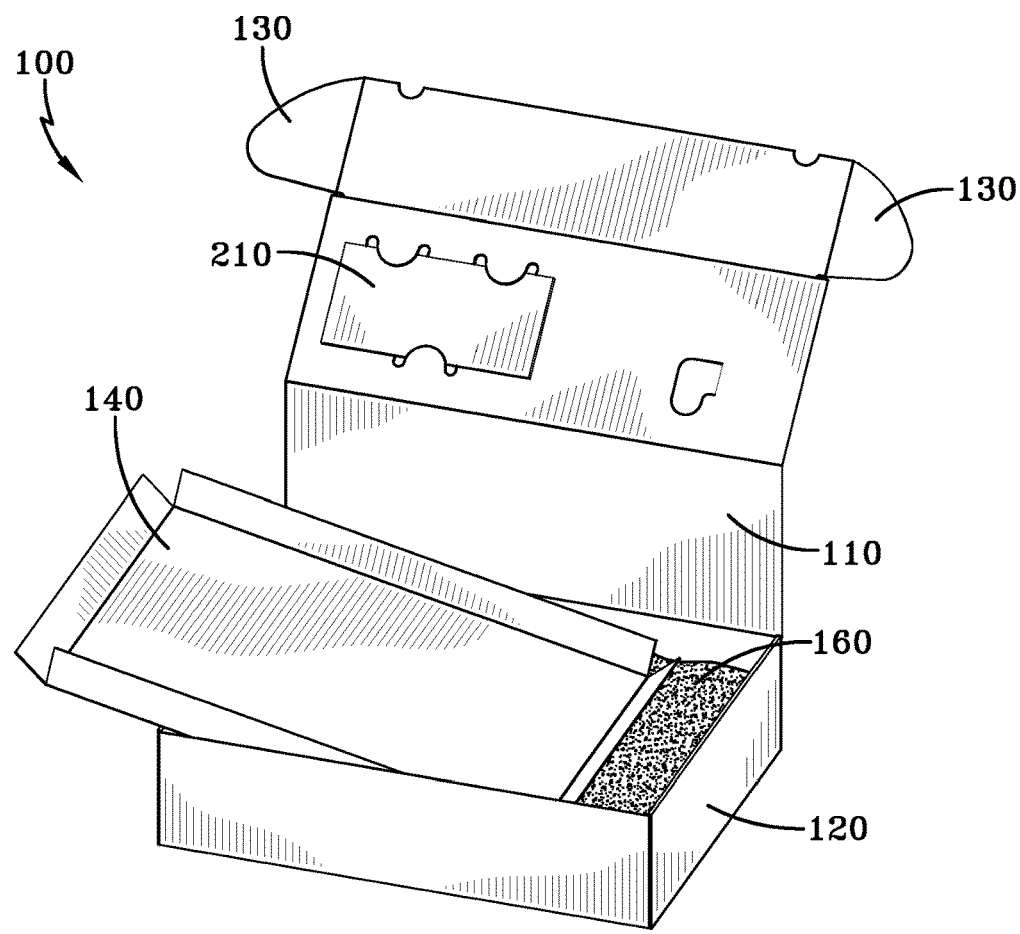
Figure 7F:
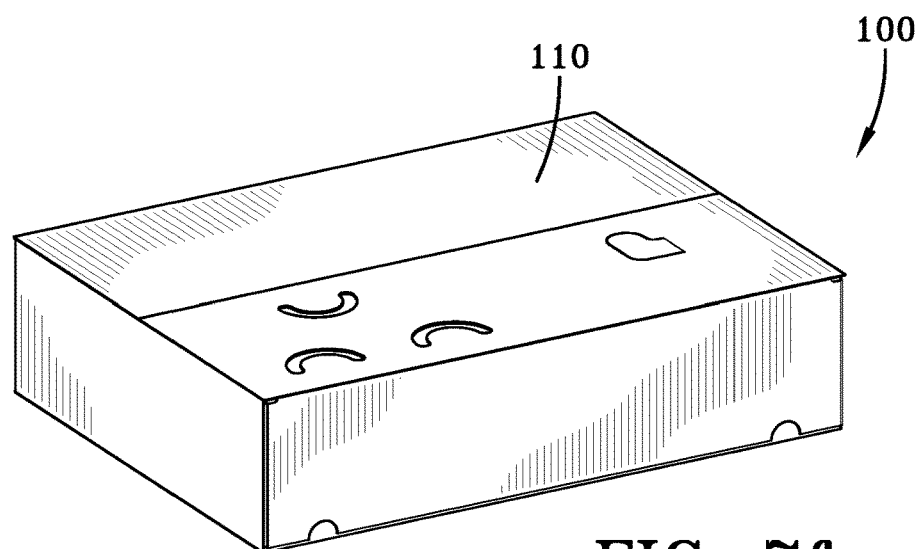
Figure 15:
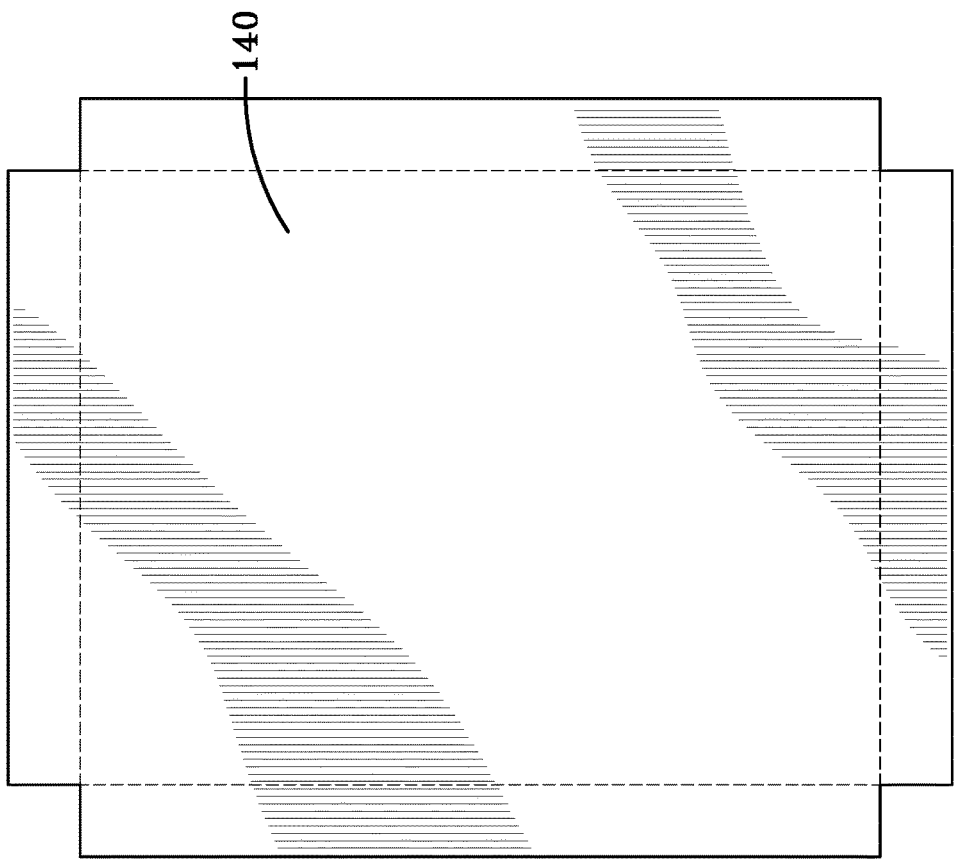
FIG. 15 shows a design schematic for an exemplary false bottom.

In some exemplary embodiments, a biodegradable litter kit comprises a litter box and a perforated false bottom 150 placed within the litter box. FIG. 2 shows an exemplary embodiment of a false bottom 150 which may be part of a biodegradable litter kit. In preferred exemplary embodiments, a litter kit comprises a litter box having a tray for holding cat litter, a retractable lid positioned over the tray such that the tray and retractable lid selectively define a cavity, and a perforated false bottom 150 placed within the cavity. Such an exemplary embodiment may further comprise cat litter and a separator piece. Preferably, the false bottom 150 is placed under the cat litter in the tray of the litter box and the separator piece 140 placed above the litter. In such an exemplary embodiment, the litter box may be used with the false bottom as soon as the separator piece has been removed from inside the tray. FIG. 15 shows a top plan view of an exemplary separator piece 140 that may be selectively positioned over litter in a biodegradable litter system to hold the litter in place during transport, repositioning of the box, etc. FIG. 7e shows an exemplary embodiment of removing an exemplary separator piece 140 from a position in which it held litter 160 in place within the tray 120 of a litter box 100 so that the litter may be used by an animal. FIG. 7d shows an exemplary embodiment of a perforated false bottom 150 which has been placed under litter in the tray of a litter box to help maintain the cleanliness of the box when it is being used by an animal. In an exemplary embodiment comprising a perforated false bottom, when the litter box is being used by a cat the false bottom may allow solid waste from cat urine to drop through the bottom, away from the cat, and may assure that the litter which the cat contacts the next time it utilizes the litter box is clean. A perforated false bottom may also reduce the likelihood that soiled litter remains on the cat's paws when it exits the box preventing the cat from tracking litter outside of the box. In preferred exemplary embodiments, the perforated false bottom defines multiple openings which are sized to prevent passage by fresh litter. In such exemplary embodiments, a layer of fresh litter material may be positioned upon the false bottom where it is held until it is used by an animal to deposit waste. Once an animal has deposited liquid waste on biodegradable litter material, it may initiate break-down of the litter. Once the litter material has been broken down, it may be of a small enough size that it may pass through the openings defined by the false bottom. In such exemplary embodiments, the soiled litter passes through the false bottom while the litter material which has not been soiled by the animal's waste remains supported by the false bottom for future use by the animal.

Figure 8:
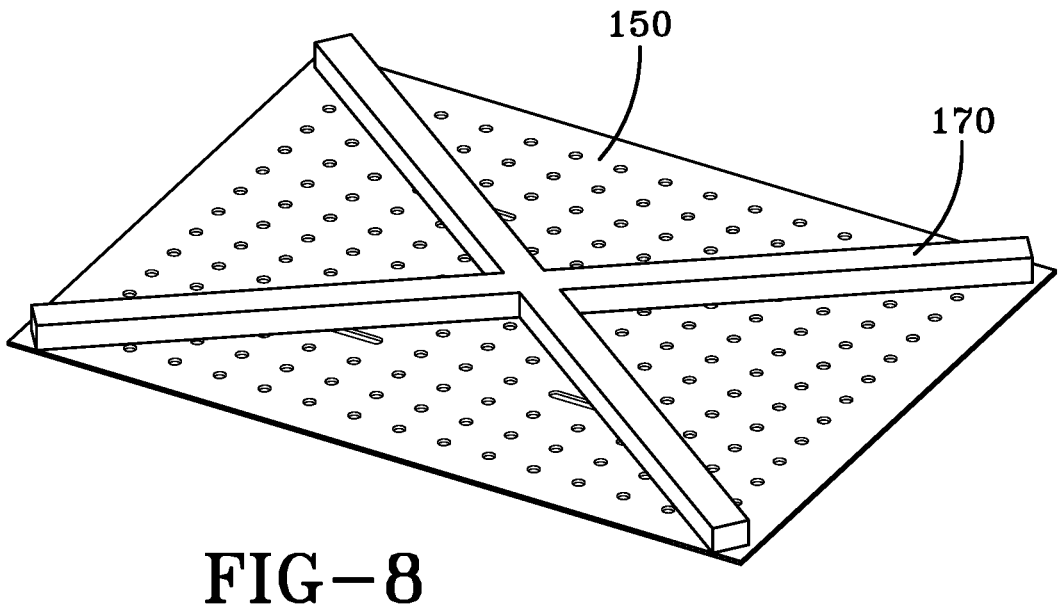
FIG. 8 shows a bottom plan view of an exemplary embodiment of a false bottom support member that may be utilized to import extra strength to a false bottom of a biodegradable litter kit shown with an exemplary false bottom.
Figure 16:
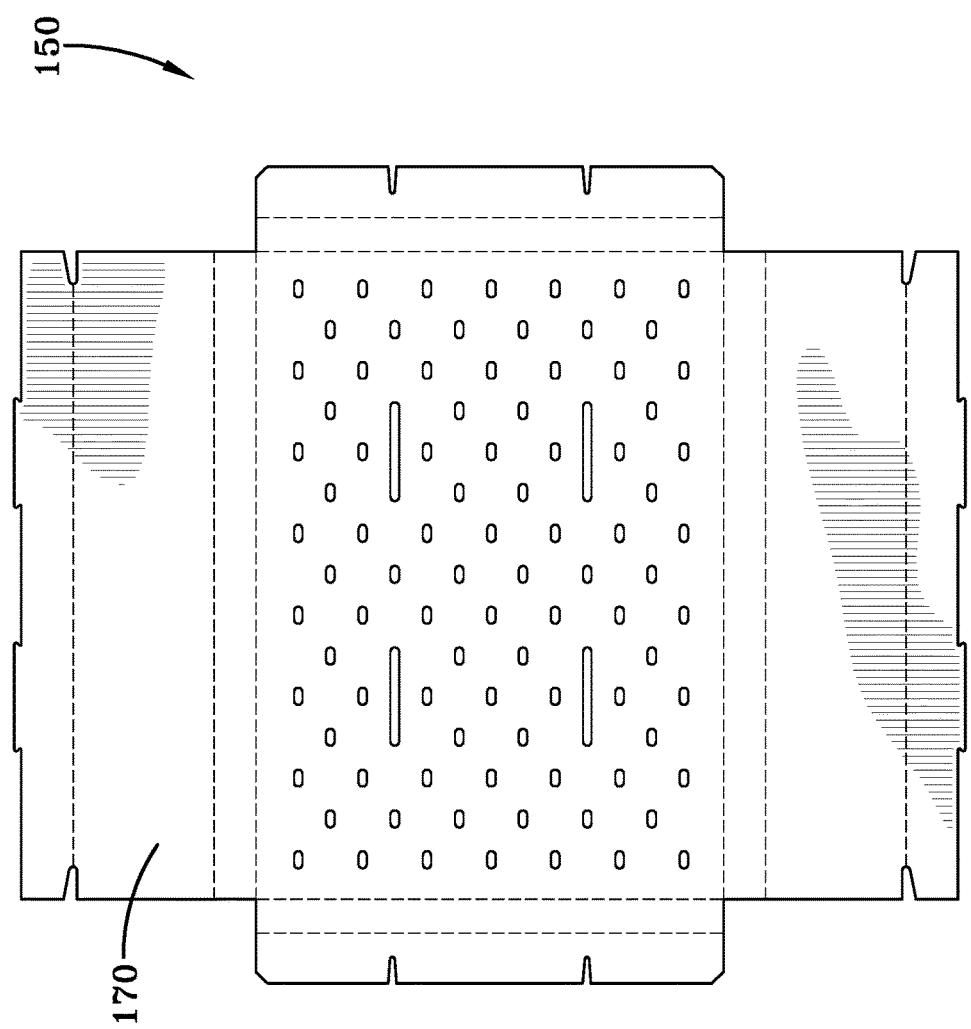
FIG. 16 shows a design schematic for an exemplary false bottom which defines multiple perforations for permitting the passage of soiled litter to the bottom portion of a litter box tray and which has an integral support.

In some exemplary embodiments, a biodegradable litter kit comprises a litter box and a false bottom placed within the litter box. The false bottom may or may not be perforated. Preferably, the false bottom is placed within the tray of a litter box and then covered with litter such that the litter is maintained within the tray of the box. The false bottom defines at least one opening through which soiled litter may pass such that it is separated from clean litter which remains on top of the false bottom after the litter has been used by an animal. In one exemplary embodiment, the false bottom defines a slit through which soiled litter may pass. The slit is an opening which is greater in length than it is in width. Some exemplary embodiments comprising a false bottom will additionally comprise a false bottom support member. A false bottom support member provides strength to the false bottom such that it is sturdier and more adequately adapted for receiving the weight of an animal when the litter box is being used. FIG. 8 shows an exemplary embodiment of a false bottom support member 170 shown against a false bottom 150. The false bottom support member may be made from the same material as the false bottom. In some exemplary embodiments, the false bottom support member 170 is integral with the false bottom 150 as shown in FIG. 2. FIG. 16 shows an exemplary embodiment of a false bottom 150 which defines multiple perforations for permitting the passage of soiled litter and which has a support member 170 integral with the false bottom. In some exemplary embodiments, a false bottom does not require a false bottom support member to have sufficient strength to hold an animal(s) during use of the box.

Some exemplary embodiments comprise a biodegradable litter box and at least one biodegradable litter box accessory. In some exemplary embodiments, a biodegradable litter kit comprises a litter box, cat litter, a scooper, and a supply of disposable bags which may be utilized to dispose of soiled litter and animal waste once the litter box has been used.

Figure 4:
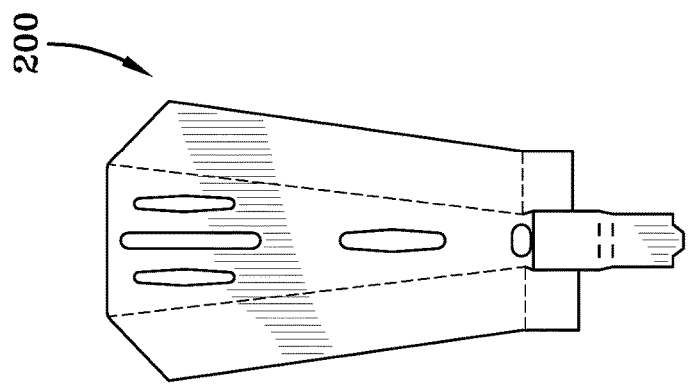
FIG. 4 shows a design schematic of a litter scoop that may be used with the exemplary lid of FIG. 1.
Figure 10:
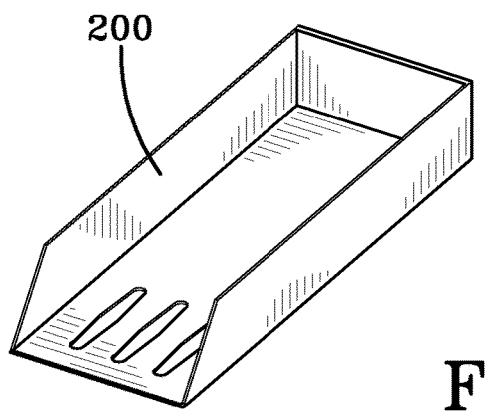
FIG. 10 shows a top plan view of an exemplary embodiment of a scooper that may be used as a litter box accessory in a biodegradable litter kit.
Figure 11:
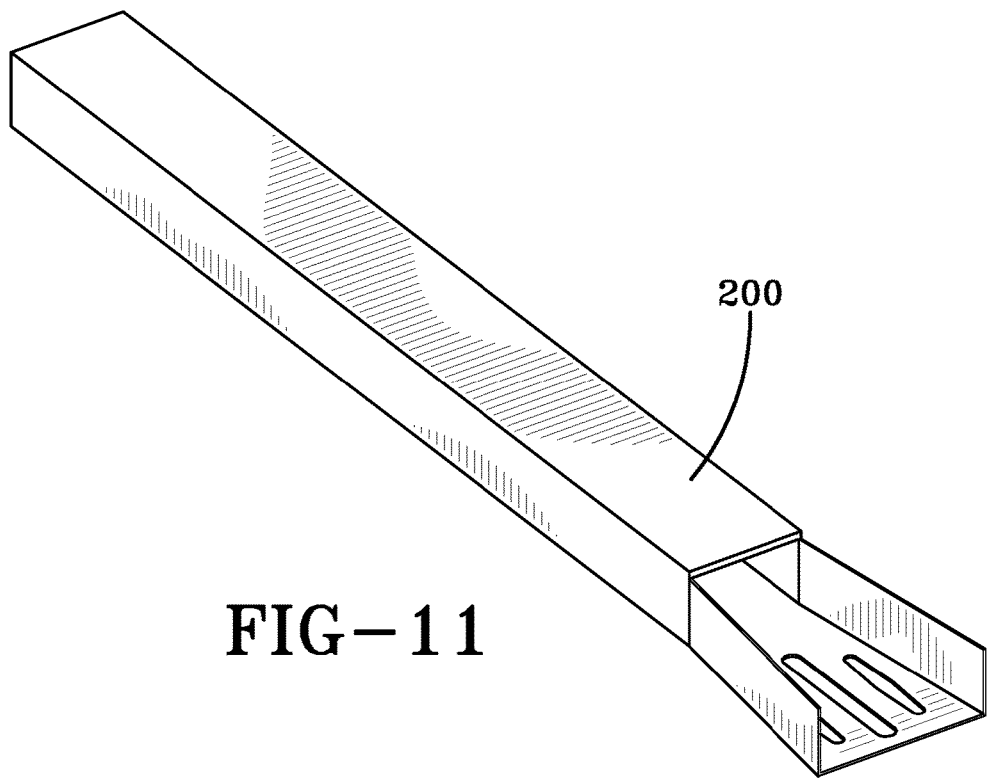
FIG. 11 shows a top plan view of an exemplary embodiment of a scooper that may be used as a litter box accessory in a biodegradable litter kit.
Figure 14:
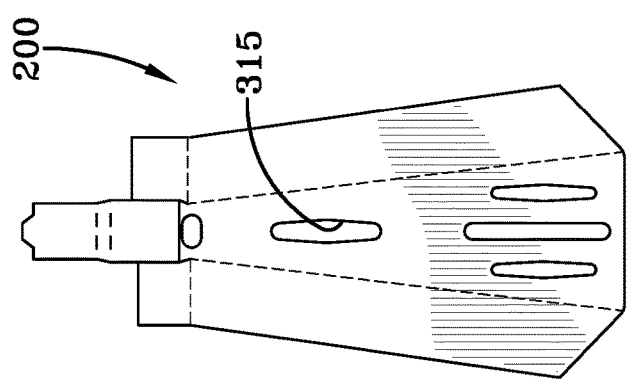
FIG. 14 shows a design schematic for an exemplary scooping accessory which defines an opening for receiving a tab defined by a litter box.

FIG. 4 shows a design schematic for an exemplary scooper 200 which may be part of a biodegradable litter kit. FIG. 10 shows a second exemplary embodiment of a scooper 200 that may be included in a biodegradable litter kit. FIG. 11 shows yet another exemplary embodiment of a scooper 200 that may be included in a biodegradable litter kit. The exemplary embodiment of a scooper 200 that is shown in FIG. 14 shows how the scooper may define at least one opening 315 for receiving a tab 180 so that the scooper may be held in a desired position by the box 100 when the scooper is not in use. As shown in FIG. 11 the scooper 200 may have a relatively long handle to facilitate cleaning of the litter box while maintaining a greater distance from animal waste. There are a variety of scooper configurations which may be utilized by a biodegradable litter kit. Preferably, the scooper is made from completely biodegradable material(s). The litter box of a kit comprising a litter box, cat litter, a scooper, and a supply of disposable bags may have a retractable lid and a perforated false bottom.

Figure 6D:
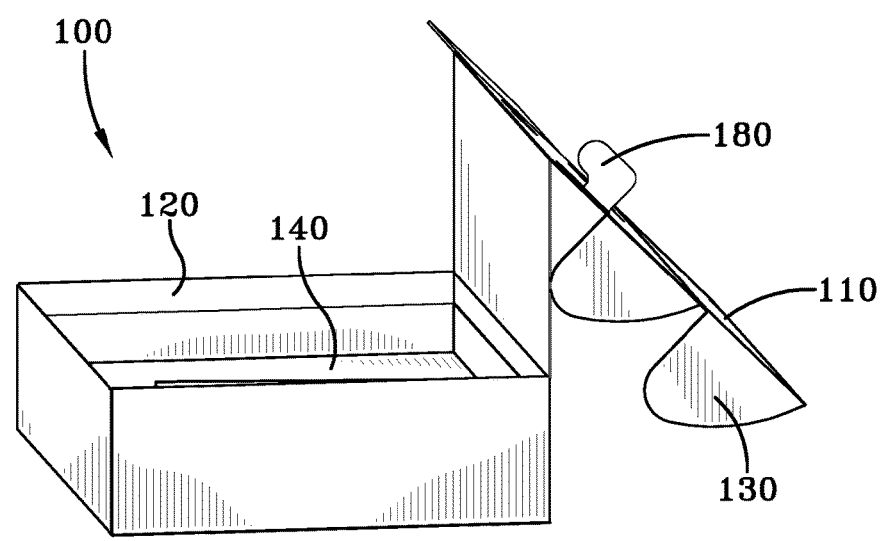
Figure 6E:
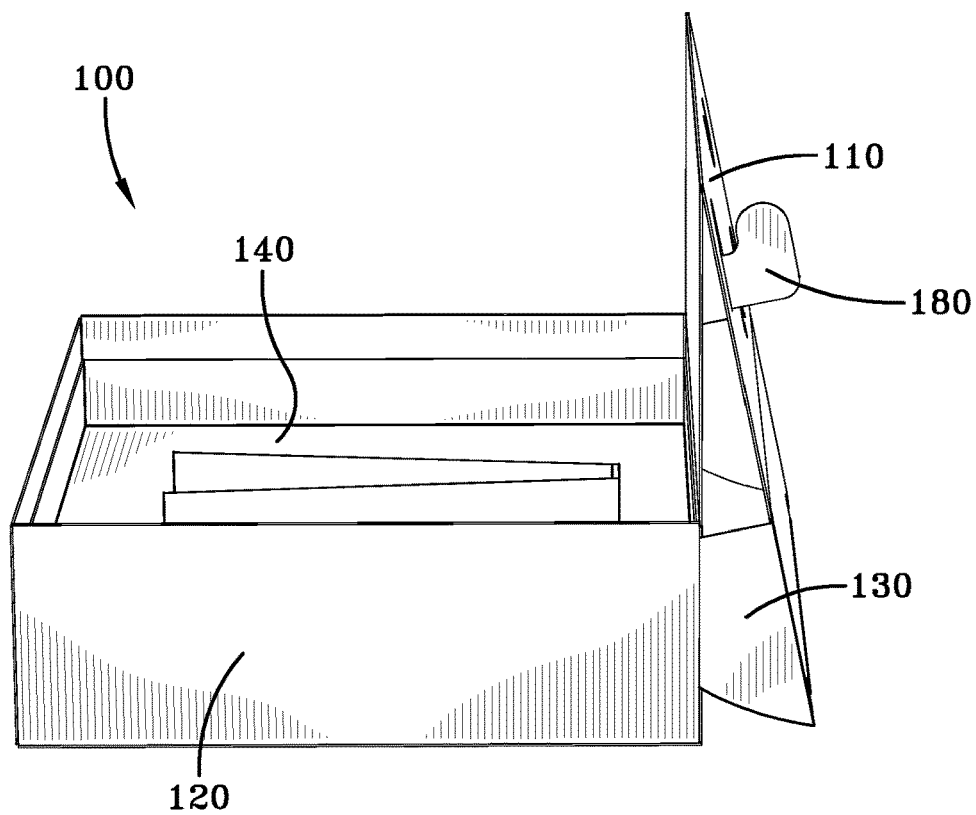
Figure 6F:
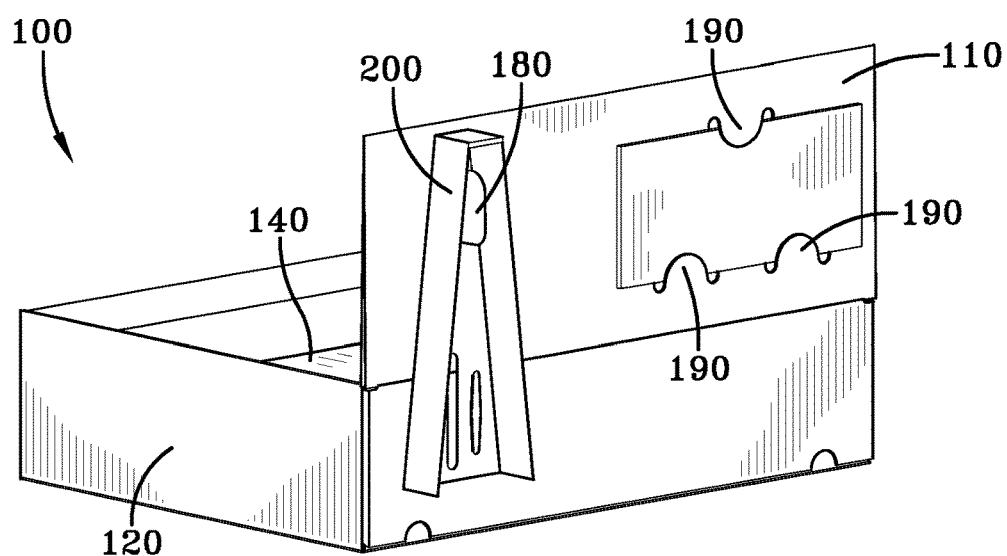

The litter box of a biodegradable litter kit may have at least one litter box accessory holding means. In some exemplary embodiments, such as that shown in FIG. 1, a retractable litter box lid may comprise at least one tab 180 for holding a litter box accessory. In exemplary embodiments where a litter box lid comprises at least one tab the tab may be utilized for holding a litter scoop that is preferably part of the litter kit. The tab may be such that it is substantially flat against the surface of the lid or such that it forms part of a flat surface of the lid, until it is selectively placed in a holding position. A holding position is a position in which the tab may hold a litter scoop or other litter box accessory in a desired position. FIG. 6d shows an exemplary embodiment of a litter box lid defining an exemplary tab where the tab is shown in a holding position. FIG. 7a shows an exemplary embodiment of a tab 180 being used to hold an exemplary scooper 200.

Figure 9:
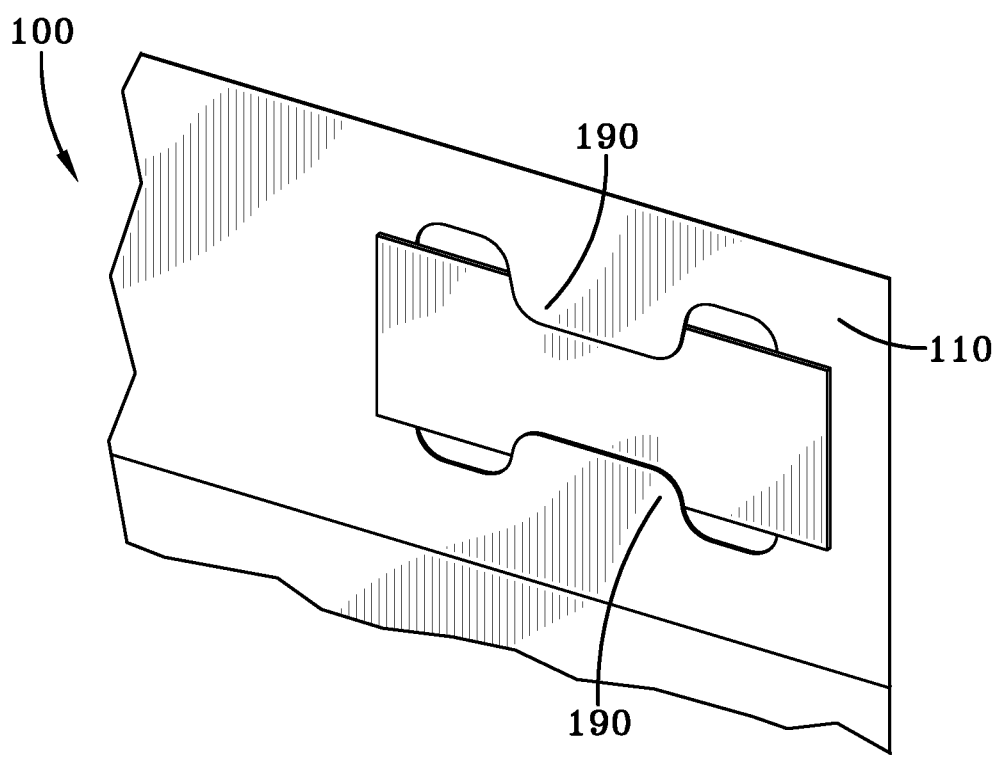
FIG. 9 shows an exemplary embodiment of a disposable bag holding means defined by an exemplary retractable lid.

In some exemplary embodiments, a biodegradable litter kit comes with at least one disposable bag 210 to be utilized in disposing of solid animal waste removed from the litter box after use by an animal. A litter box accessory holding means of a litter box may be able to hold disposable bags. The exemplary embodiment of FIG. 1 shows that a retractable lid may define a disposable bag holding means 190. FIG. 6b shows a disposable bag holding means 190 made up of three openings defined by the retractable lid of a litter box. A similar disposable bag holding means is shown in the exemplary embodiment shown in FIG. 13 which also shows how a retractable lid 110 of a biodegradable litter box 100 may define a tab 180 for holding a litter scooping accessory. FIG. 7a shows an exemplary disposable bag holding means 190 being used to hold disposable bags 210. FIG. 9 shows another exemplary embodiment of a disposable bag holding means 190 that may be implemented by a litter box in a biodegradable litter kit.

In some exemplary embodiments, a biodegradable litter kit includes a supply of disposable bags 210 designed to last the user of a litter box over a certain time period. For example, a litter kit may include 15 disposable bags 210 so that the litter kit may ideally be used for fifteen days. In such an exemplary embodiment, a disposable bag 210 may be used every day to dispose of solid waste removed from the litter box. Preferably, the kit also comes with a supply of litter 160 designed to last for the same period of time as the disposable bags 210. The disposable bags 210 are preferably made from biodegradable material(s).

In exemplary embodiments of a kit comprising a litter box, cat litter, a scooper, and a supply of disposable bags, the litter box, cat litter, scooper, and bags may all be biodegradable (including the lid and false bottom of the box if included). When a biodegradable litter kit comprises a scoop and disposable bags, the scooper may be used periodically, for example every day, to remove solid waste and soiled litter from a litter box and place it into one of the bags for disposal. Preferably, the litter and litter box are also part of the kit and the litter box comprises a tray which holds the cat litter as well as a retractable lid. In such an exemplary embodiment, once all of the disposable bags have been used, a separator piece 140 may be positioned within the tray 120 of the litter box over any litter 160 that may remain inside and the scooper 200 may also be placed within the tray. It may be possible to move the lid 110 from the retracted position into a closed position, closing off the used litter 160, separator piece 140 and scooper 200 within the litter box tray 120. Once the retractable lid has been placed in a closed position, the litter box and its used contents may be thrown away.

In one exemplary embodiment, a biodegradable litter kit comprises more than one litter box, where each litter box comprises a tray holding cat litter, a retractable lid in a closed position over the tray, a scooper, and a supply of disposable bag(s). Preferably, the number of litter boxes and disposable bags included in the kit is dependent on the time period for which the kit is supposed to last the user. For example, a kit may include two litter boxes where each litter box system comprises 15 disposable bags such that the kit is intended to provide its user with a one-month supply. In an exemplary embodiment comprising more than one litter box, where each litter box comprises a tray holding cat litter, a retractable lid in a closed position over the tray, a scooper, and a supply of disposable bag(s) the scooper and disposable bags may be placed within the litter-holding portion of the tray of the associated litter box before the lid of the box is placed in a closed position. Once the scooper and bags have been placed within the tray, the retractable lid of the litter box may be closed thus, keeping the components of each litter box within the box until the lid is retracted for use. A separator piece may be placed between the litter and any accessories placed within the tray of the litter box. In another preferred exemplary embodiment a biodegradable litter kit comprises a quantity of boxes, litter, scoopers, bags, etc. to provide a user with animal waste facilities for a two month period. The two month supply biodegradable litter system may contain twice of what is contained in a one-month supply biodegradable litter system in some exemplary embodiments. The two-month biodegradable litter system may be shipped to a user in biodegradable package.

A preferred exemplary embodiment of a biodegradable litter kit comprises two litter boxes, where each litter box comprises a tray holding cat litter, a retractable lid in a closed position over the tray, a separator piece placed within the tray and over the litter such that it prevents the litter from exiting the tray, and 15 disposable bags placed within a cavity defined by the closed lid and the tray. The kit comprising two litter boxes may be placed into a single master box. The master box may be a shipping box which permits shipping of the biodegradable litter kit to a user so that they have a one month supply of litter and associated materials. Of course it will be apparent to one of ordinary skill upon reading this discloser that all biodegradable litter kits may be shipped to users in a shipping box (or multiple boxes) irrespective of the number of litter boxes included in the kit. FIG. 5 shows an exemplary embodiment of a master box that may be utilized to ship a biodegradable litter kit.

Figure 12A:
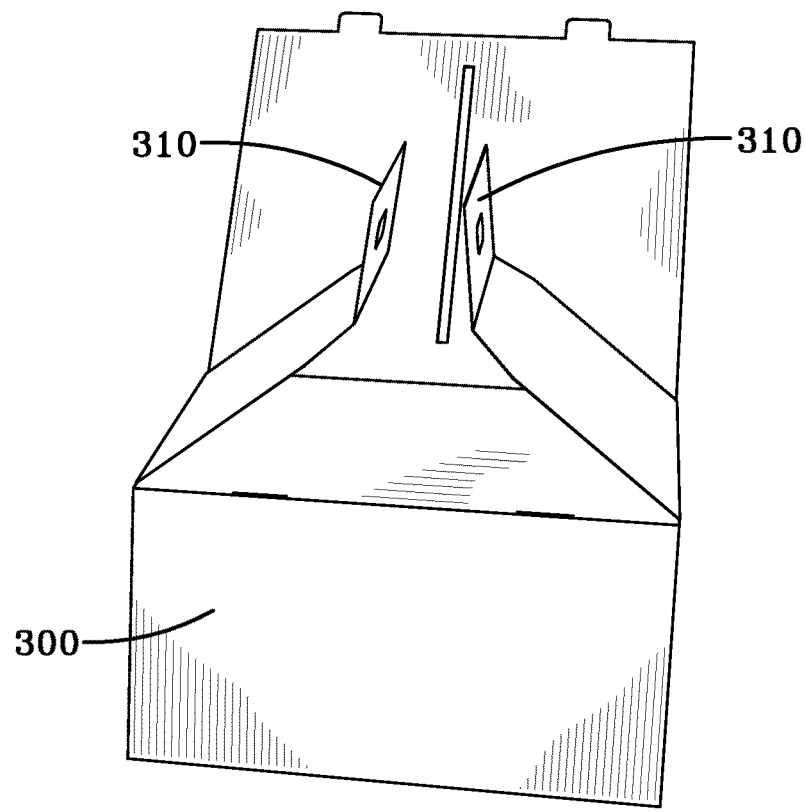
FIG. 12a shows a front perspective view of part of an exemplary embodiment of a master box with an exemplary handle, 12b shows a top perspective view of part of the exemplary embodiment of a master box with the handle shown ready to be utilized.
Figure 12B:
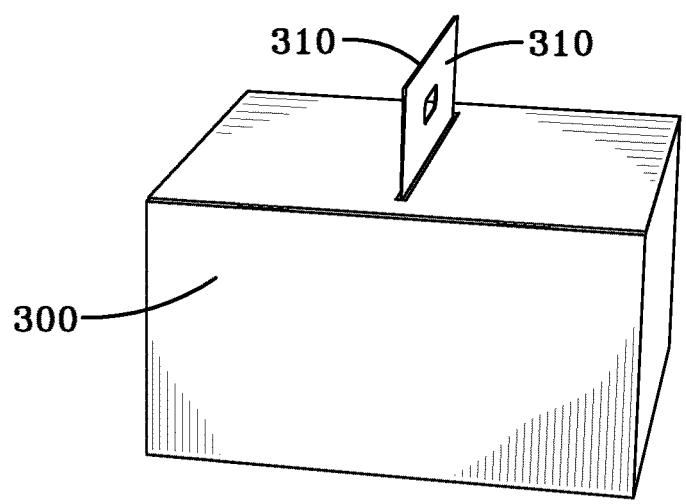
Figure 17:
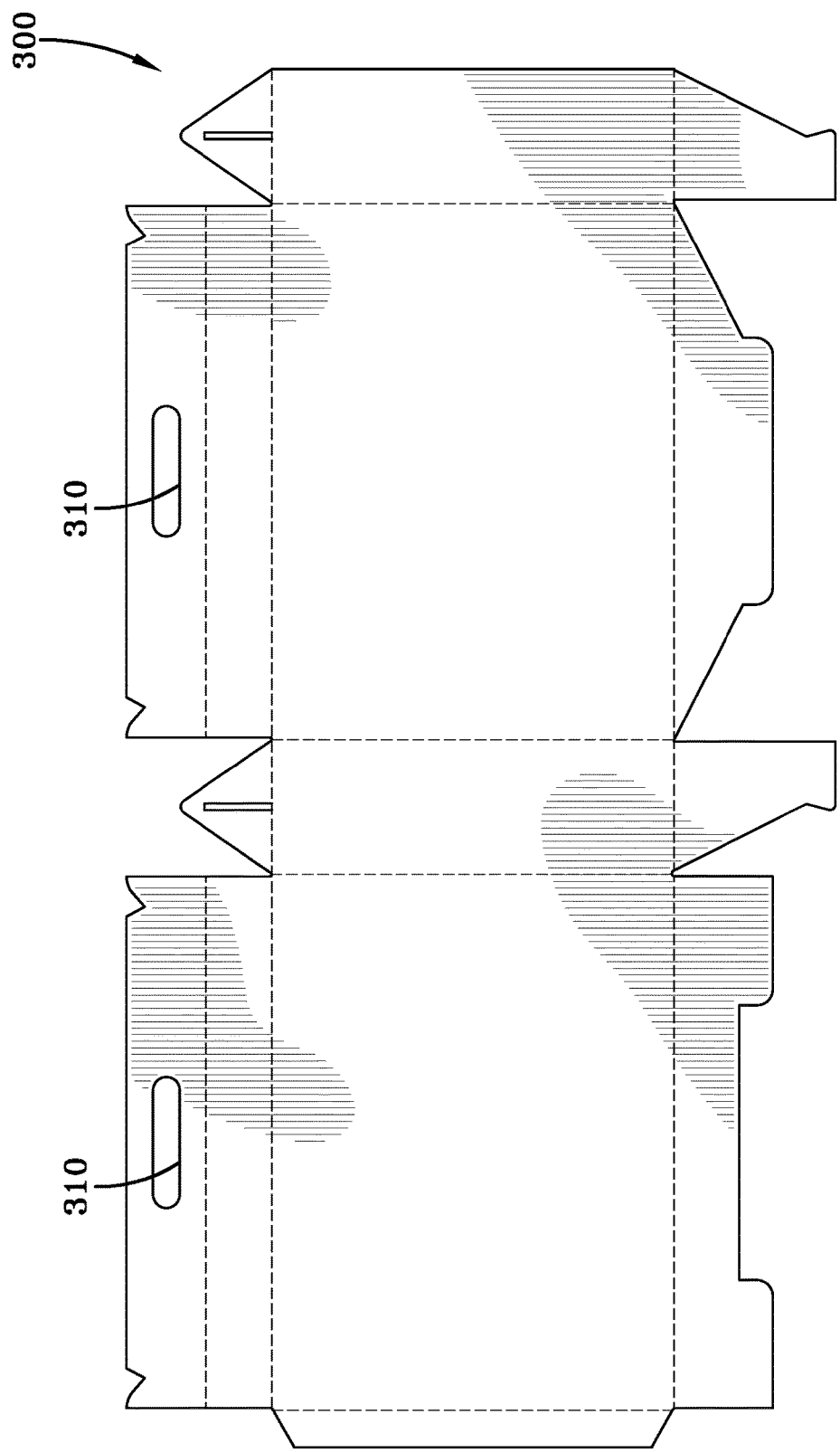
FIG. 17 shows a design schematic for an exemplary master box which may hold a single biodegradable litter box kit.
Figure 18:
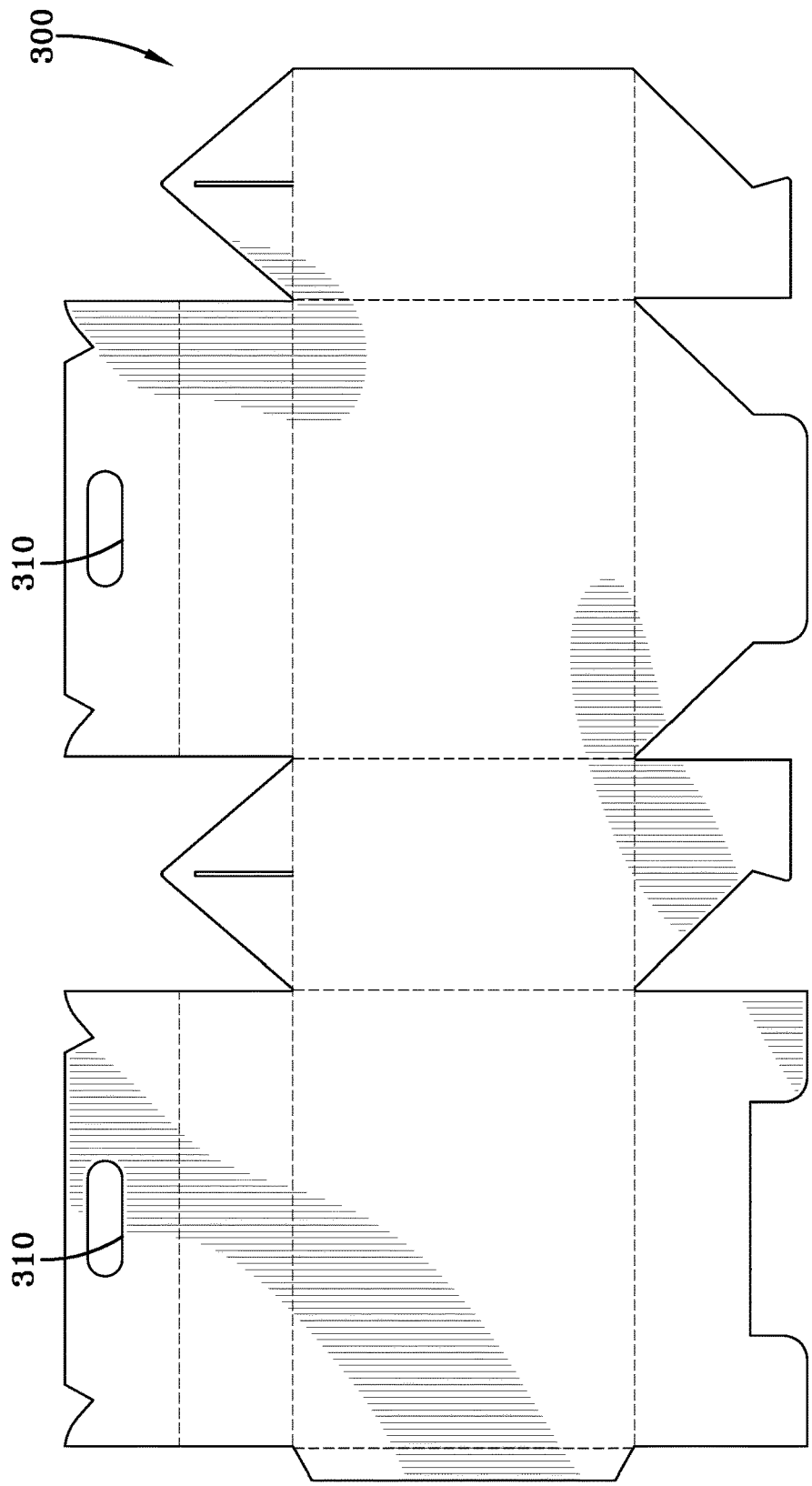
FIG. 18 shows a design schematic for an exemplary master box which may hold two biodegradable litter box kits.

In some exemplary embodiments, a biodegradable litter kit comprises a master box and more than one litter box temporarily housed within the master box. The master box preferably comprises at least one handle which may be utilized to transport the master box. In some exemplary embodiments, the handle of a master box is at least one opening defined by the master box where the opening is large enough to receive part of the hand of an individual transporting the master box. FIG. 5 shows an exemplary embodiment of a master box 300 having a handle 310 where the handle is at least one opening defined by the master box 300. FIG. 12 shows another exemplary embodiment of a handle 310 that may be utilized by a master box 300. FIG. 17 shows an exemplary embodiment of a master box 300 which defines a handle 310 and which is designed to ship a litter kit of a single biodegradable litter box 100. FIG. 18 shows an exemplary embodiment of a master box 300 which defines a handle 310 and which is designed to ship a litter kit comprising two biodegradable litter boxes 100.

In some exemplary embodiments, a biodegradable litter box kit comprises at least one litter box that does not include a retractable lid. In such an exemplary embodiment, the litter box may comprise a tray holding cat litter and a separator piece placed within the tray and over the cat litter such that the litter is sealed within the tray by the separator piece and the tray until it is desired that the litter be accessed by an animal for use at which time the separator piece may be removed from its position within the tray.

In some exemplary embodiments, a litter kit comprises a single piece of biodegradable material configured to be turned into at least one (sometimes multiple) litter boxes. The litter box may or may not comprise a retractable lid. In a preferred exemplary embodiment, a single piece of post-consumer, biodegradable fiberboard is pre-perforated to assist a user in separating the piece into more than one litter box and/or to assist the user in folding the material such that it may be used to hold cat litter. The single piece may be sent to the user in a substantially flat form so that the user can easily store the litter box upon receipt, but can then fold the material into a litter box when it is desired that the box be used.

In some exemplary embodiments of a biodegradable litter kit, at least one kit component is manufactured from post-consumer, biodegradable fiberboard or other biodegradable material. In a preferred exemplary embodiment, a kit comprises a litter box, a perforated false bottom, a separator piece, a scooper and a shipping box which are all made from post-consumer, biodegradable fiberboard or other biodegradable material. In such an exemplary embodiment, each component of the kit does not have to be made from the same biodegradable material, but that is a viable option. Some exemplary embodiments of a biodegradable litter kit comprise disposable bags that are made from a biodegradable material.

In some exemplary embodiments, a biodegradable litter kit comprises a litter box which is approximately 18 inches long, 15 inches wide, and 5 inches deep. It will be appreciated that the box may have any other convenient dimensions and in some preferred exemplary embodiments will have smaller dimensions. Exemplary embodiments of a biodegradable litter kit comprising litter may utilize pine pellets as the litter. The pine pellets may be 100% pine pellets. The pine pellets may have a depth of approximately 1½ inches. The pine pellets may break down into wood or pine fibers that do not need to be scooped as conventional cat litter does. Rather, the soiled fibers may be sifted away from clean litter and drop through the perforated false bottom in exemplary embodiments where a false bottom is included. Other types and depths of litter may be also be used. For example, any mixture of wood pellets may be used in some exemplary embodiments. In some embodiments, a biodegradable litter system may utilize litter made from materials including but not limited to coconut hauls, peanut hauls, corn, etc.

In some exemplary embodiments, it may be necessary to transition an animal into using a biodegradable litter kit. This is because the litter used by a biodegradable litter kit (for example, pine pellets) may be different from the litter that has been used by the animal in the past. Steps may be taken in transitioning the animal into using the biodegradable litter kit. In a preferred exemplary embodiment, a biodegradable litter kit comprises a litter box having a tray holding pine pellet cat litter. The pine pellets are present in the tray such that it is possible to add a layer of another type of litter over the pine pellets. In transitioning a cat into using the biodegradable litter kit, a layer of the litter the cat has traditionally used may be placed over the pine pellet litter. In exemplary embodiments, there is no need to mix the two layers of litter as the cat using the box will naturally mix them. As the litter box with the two types of litter is used it should be maintained by removing any solid waste present in the box and any clumping clay (if scoopable litter is being used). In an exemplary embodiment, after two weeks of using a box with pine pellet litter and the cat's traditional litter, the cat should be ready and adjusted to the pine litter such that it will use a litter box having only pine pellet litter in the tray. A longer or shorter time period may be needed in some examples.

It should be understood, of course, that the foregoing relates to exemplary embodiments of the invention and that modifications may be made without departing from the spirit and scope of the invention as set forth in the following claims.

The invention claimed is:

1. A biodegradable litter kit for use by an animal comprising:
   a foldable box comprising a tray portion for holding litter wherein the tray has a bottom and at least one side extending away from the bottom and further comprising a retractable lid such that the lid may be selectively moved from a position in which it prevents access to the tray portion of the box into a position in which an animal may access the tray of the box to deposit waste in the litter;
   a substantially flat false bottom positioned within the tray wherein the false bottom is adapted to hold a layer of fresh litter at a position located between the false bottom of the tray and the retractable lid and not in contact with the bottom of the tray and wherein the false bottom defines multiple perforations wherein the perforations in the false bottom are too small to permit passage of the fresh litter to the bottom of the tray but are sufficiently large as to permit soiled litter which is partially dissolved to pass through the perforations, the false bottom being located a distance sufficient from the bottom of the tray to allow soiled litter to freely fall into and accumulate in a space defined between the false bottom and the tray bottom; and
   at least one support member running between the bottom of the tray and the false bottom;
   wherein the litter box and the perforated false bottom are all biodegradable and wherein the false bottom is sufficiently rigid to support the weight of the litter while defining the space.

2. The kit of claim 1 further comprising a locking mechanism connected to the tray for holding the lid in a retracted position.

3. The kit of claim 2 where the locking mechanism comprises at least one flap.

4. The kit of claim 3 wherein the locking mechanism uses the friction formed between the at least one flap and a slot formed in a portion of the box to hold a portion of the lid within the flap.

5. The kit of claim 1 further comprising a separator piece positioned between the layer of fresh litter and the lid such that the separator piece seals the litter within the tray when the box is not being used.

6. The kit of claim 1 wherein the layer of fresh litter comprises pine pellets.

7. The kit of claim 1 wherein the lid defines an opening for selectively holding at least one biodegradable waste bag and wherein the kit further includes at least one biodegradable waste bag to be selectively held by the lid until used for disposing solid animal waste.

8. The kit of claim 1 further comprising a biodegradable scooper.

9. The kit of claim 1 wherein the retractable lid is connected to at least part of a side of the tray.

* * * * *